United States Patent [19]
Worner

[11] 3,982,617

[45] Sept. 28, 1976

[54] CLUTCH DISC FOR MAIN CLUTCHES OF MOTOR VEHICLES

[75] Inventor: Gunter Worner, Rommelshausen, Germany

[73] Assignee: Daimler-Benz Aktiengesellschaft, Germany

[22] Filed: Apr. 15, 1974

[21] Appl. No.: 460,999

[30] Foreign Application Priority Data

Apr. 14, 1973  Germany............................ 2318907

[52] U.S. Cl. ............................................. 192/106.2
[51] Int. Cl.² ............................................. F16D 3/14
[58] Field of Search ................................. 192/106.2

[56] References Cited
UNITED STATES PATENTS

| | | | |
|---|---|---|---|
| 2,745,268 | 5/1956 | Reed............................ | 192/106.2 X |
| 3,327,820 | 6/1967 | Maurice....................... | 192/106.2 X |

FOREIGN PATENTS OR APPLICATIONS

| | | | |
|---|---|---|---|
| 1,094,762 | 12/1967 | United Kingdom.............. | 192/106.2 |
| 1,200,013 | 7/1970 | United Kingdom.............. | 192/106.2 |

*Primary Examiner*—Benjamin W. Wyche
*Attorney, Agent, or Firm*—Craig & Antonelli

[57] ABSTRACT

A clutch disc for motor vehicle main clutches in which the disc member carrying the friction linings is torsionally elastically connected with the flange of a hub member, whereby several springs or spring sets of different characteristics are arranged in windows at the hub flange, on the one hand, and of the disc member as well as of a side plate rigidly connected therewith, on the other; at least two friction devices for the damping are provided whereby the start of the operation of at least one damping device is determined by a control plate which with its tabs, arms or the like engages into the windows intended for the accommodation of the springs and cooperates with the springs; the connection between the disc member and the side plate takes place by way of several axially parallel bolts which extend through the hub flange in corresponding apertures; the control plate has two approximately radially extending arms which include each a radial extension that—in relation to a direction of rotation—abut at opposite spring ends; at least one arm thereby also engages with an axially bent-off portion into the corresponding window at the hub flange.

17 Claims, 5 Drawing Figures

CLUTCH DISC FOR MAIN CLUTCHES OF MOTOR VEHICLES

The present invention relates to a clutch disc for motor vehicle main clutches in which a disc member carrying the friction linings is operatively connected torsionally elastically with the flange of a hub member, whereby several springs or spring sets or different characteristics are arranged in windows of the hub flange, on the one hand, and of the disc member as well as of a side plate rigidly connected therewith, on the other, and whereby at least two friction devices for the damping are provided and whereby the starting point of operation of at least one of the damping devices is determined by a sheet-metal control plate which with tabs, arms or the like engages in the windows intended for the accommodation of the springs and cooperates with the spring ends, and whereby the connection with the disc member and the side plate takes place by several parallel bolts which extend through the hub flange in corresponding apertures.

A clutch disc of the aforementioned type is already known (German Democratic Republic Patent 57,771) in which the sheet metal control plate is constructed three-armed and encloses the corresponding springs with three two-pronged fork arms. In this prior art clutch, however, only two spring stages are provided. However, if one desires to go over into a multi-stage spring construction—for example, to provide altogether four spring steps or stages—then the freedom of construction and design is limited with this known construction of the control plate.

The present invention is concerned with the task to avoid the described disadvantages and to propose arrangements, in which as large as possible a constructive freedom exists as regards the selection of the spring stages or steps. The underlying problems are solved in accordance with the present invention in the clutch discs of the aforementioned type in that the sheet-metal control plate includes two approximately radially extending arms, of which each has a radial extension which abut at opposite spring ends—in relation to the direction of rotation—, and in that at least one arm engages with an axial angularly bent-off portion in the corresponding window at the hub flange. As can be further seen from the following description, the respective control devices for the forward and return movement are thereby combined among each other at the respective arms.

The proposed construction offers the advantage that now a larger constructive freedom results as regards the arrangement of the springs. However, these advantages are not limited thereto at all. Instead, the starting point of operation of the damping device can now be separated from that of the springs by a corresponding predetermined play or clearance between the control tabs and the corresponding window edges. This means, one has the advantageous possibility to move up, for example, an increased damping from a harder spring range into a preceding softer spring range. This produces a shock reduction during a change from thrust to traction and additionally entails the advantage that the damping does not become effective during the return movement if one provides the corresponding predetermined play also in connection with the return movement extensions.

Another approach for the solution of the underlying problems according to the present invention resides in connection with the aforementioned clutch discs in that at least one of these apertures is deepened radially inwardly and serves within this area for the engagement of an axial tab arranged at the control plate and that additionally two radial arms are arranged at the control plate which abut at opposite spring ends—in relation to a direction of rotation. In this construction, the control devices for forward and return movement would be separate from one another, so to speak of, and an additional function is transferred onto the already present apertures. The same advantages can be achieved with this arrangement, as were already described hereinabove. The arrangement can thereby be made advantageous in such a manner that all present apertures, for example, three apertures also cooperate with corresponding tabs at the control plates.

Accordingly, it is an object of the present invention to provide a clutch disc for main clutches of motor vehicles which avoids by simple means the aforementioned shortcomings and drawbacks encountered in the prior art.

Another object of the present invention resides in a clutch disc for motor vehicle main clutches which offers a considerably greater constructive freedom, particularly as regards the selection of the different spring stages.

A further object of the present invention resides in a clutch disc for main clutches in which the starting point of the operation of the damping devices can be separated from those of the springs, thereby offering the possibility of an increased damping in a relatively softer spring range.

Still a further object of the present invention resides in a clutch disc of the aforementioned type which results in a shock reduction during the change from thrust to traction and also permits the possibility of rendering the damping ineffectual during the return movement.

These and other objects, features, and advantages of the present invention will become more apparent from the following description when taken in connection with the accompanying drawing which shows, for purposes of illustration only, two embodiments in accordance with the present invention, and wherein.

Figure 1:
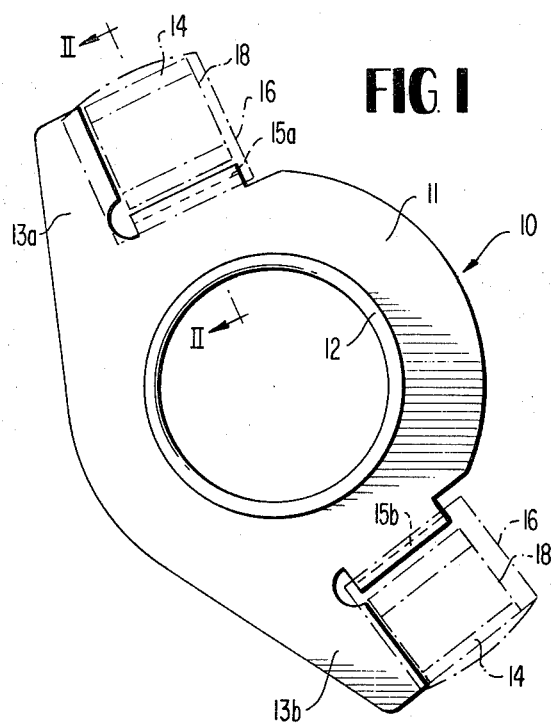
FIG. 1 is an elevational view of a first embodiment of a control plate for the clutch disc of a main clutch in accordance with the present invention.
Figure 2:
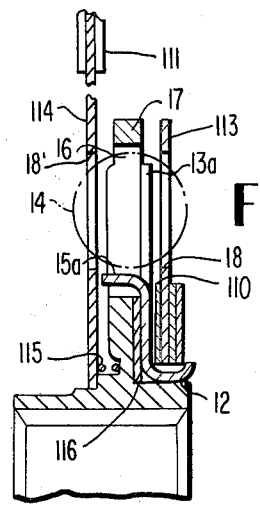
FIG. 2 is a cross-sectional view taken along line II—II of FIG. 1.

Referring now to the drawing wherein like reference numerals are used throughout the various views to designate like parts, and more particularly to FIGS. 1 and 2, according to these two figures, the sheet metal control plate generally designated by reference numeral 10 includes inwardly thereof an annular disc portion 11 which is intended for the cooperation with a friction device of conventional construction which includes the usual friction members 110, 116, springs 115, side plate 113 and disc member 114 carrying friction linings 111 suitably fastened to the hub flange 17. A sleeve extension 12 is disposed completely inwardly thereof which serves for the accommodation and mounting of the friction device. Two radial extensions 13a and 13b are provided at the annular disc portion 11 on approximately mutually opposite sides. These extensions 13a and 13b abut at the ends of the springs 14, indicated only schematically in dash and dot lines. The arrangement is thereby made in such a manner that the extension 13a becomes effective in the one direction of rotation and the extension 13b in the other direction of rotation. In relation to a direction of rotation, the extensions 13a and 13b therefore abut at opposite sides of the springs 14. These extensions 13a and 13b serve—as will be explained briefly hereinafter—for the return of the control plate 10 into the center position.

Directly adjacent the extensions 13a and 13b are disposed axially directed angularly bent portions 15a and 15b which engage into the windows 16 at the hub flange 17. The width of the angularly bent portions 15a and 15b in the circumferential direction corresponds thereby exactly to the width of the windows 18, 18' in the disc member 114 and in the side plate 113, in which the springs 14 are accommodated. This means that the starting point of operation of the damping is equal to the starting point of operation of the spring.

If the hub flange 17 is rotated from the illustrated position with respect to the disc portion 11 in the clockwise direction, then at first—if one ignores for the time being the other spring stages—nothing at all happens at the springs 14. Only when the edges of the windows 16 which are disposed to the rear of the springs 14, as viewed in the direction of rotation, have reached the spring ends and the rotation continues, the springs are compressed. The window 16 thereby also takes along by means of the aforementioned edges the annularly bent portions 15a and 15b in the stated direction of rotation. The friction device thereby becomes effective. During this further rotation, the extension 13b lifts off from the respective spring 14. During the return movement, i.e., during the reverse direction of rotation, the operation takes place in an exactly reverse manner whereby at first the two springs 14 push in front of themselves the windows 16 of the hub flange 17 as also the extensions 13a and 13b. The extensions 13a, 13b and the control plate 10 are therefore taken along for such length of time until the springs 14 again fill out exactly the windows 18. The angularly bent portions 15a and 15b have then been lifted off from the edges of the windows 16. The hub flange 17 itself can be returned again by the other springs up to its original, normal position.

Figure 3:
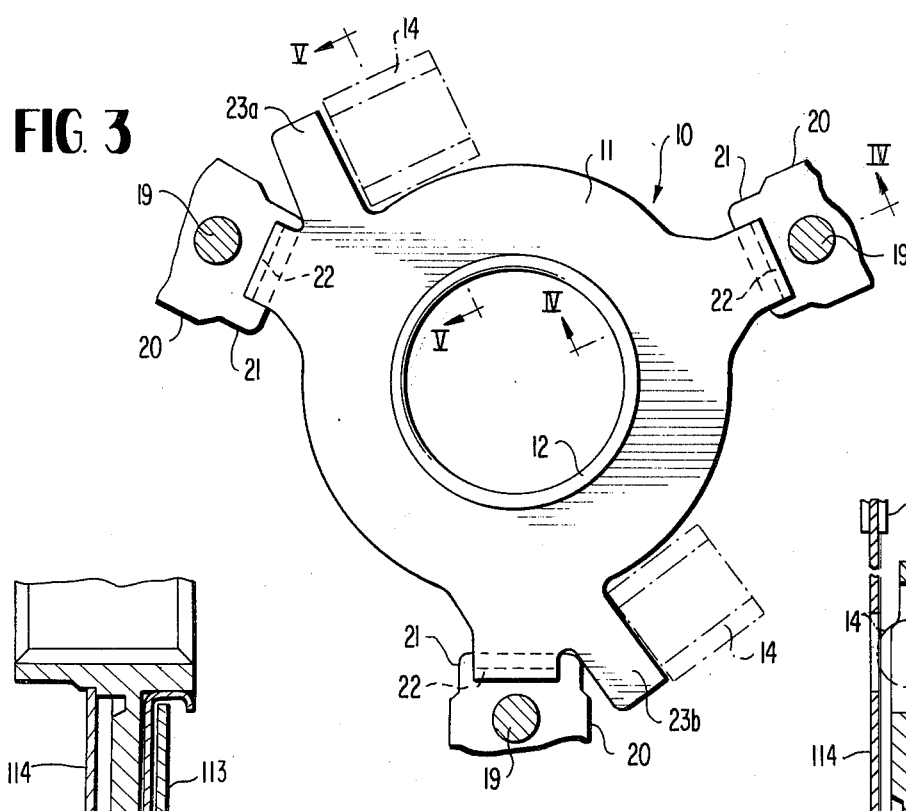
FIG. 3 is an elevational view of a modified embodiment of a control plate for a clutch disc of a main clutch in accordance with the present invention.
Figure 4:
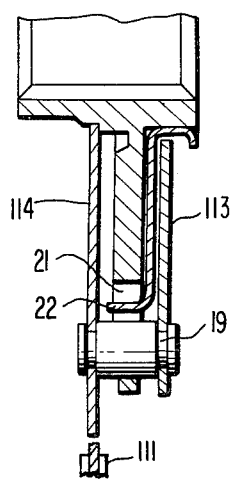
FIG. 4 is a cross-sectional view taken along line IV—IV of FIG. 3.
Figure 5:
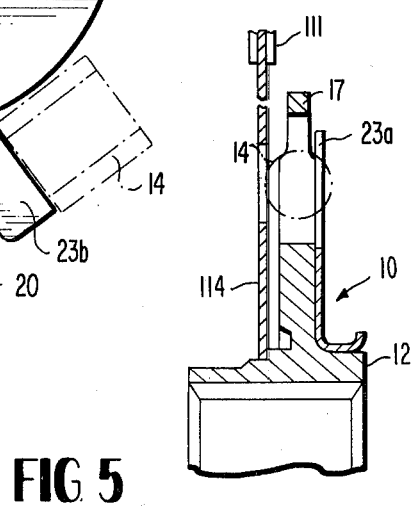
FIG. 5 is a cross-sectional view taken along line V—V of FIG. 3.

According to FIGS. 3 to 5, the control plate 10 includes again the annular disc portion 11 and the sleeve portion 12. The apertures 20 intended for the passage of the bolts 19 are recessed inwardly and form the rear control windows 21 for the angularly bent portions 22 provided at the control plate 10. The spacing of the respective edges from one another again determines the starting point of the operating range. Additionally, the radial extensions 23a and 23b are arranged at the control plate 10 which again cooperate with the ends of the springs 14. The operation of this arrangement is exactly the same as described hereinabove in connection with FIGS. 1 and 2.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. In a clutch disc arrangement for main clutches which includes a hub means, a flange on said hub means, a disc means operatively connected with the flange of the hub means so as to permit a predetermined rotation of said disc means relative to said hub means, side plate means, means for rigidly connecting said side plate means with said disc means, friction linings provided on said disc means, a first set of window means provided in said hub flange, a second set of window means provided in said disc means in alignment with said first set of window means, a third set of window means provided in said side plate means in alignment with said first and second set of window means, at least two spring means each of which is respectively arranged in the window means of said flange, said disc means, and said side plate means, and at least two friction means for the damping of the clutch disc arrangement, the improvement comprising: a control plate means for determining the starting point of operation of at least one of said friction means, said control plate means being mounted on said hub means so as to permit limited relative rotation therebetween, said control plate means including two radially extending arms provided on said control plate means at approximately mutually opposite sides thereof, each of said radially extending arms respectively abutting only one end of said at least two spring means, the respective ends of the spring means abutting the radially extending arms being oppositely disposed with respect to each other in relation to a direction of rotation of said hub means relative to said disc means, and a further means is provided on said control plate means extending into one of said window means of said first set of window means provided at the flange for limiting the relative rotation between said hub means and said control plate means.

2. A clutch disc arrangement according to claim 1, wherein said further means is a tab provided on said control plate means.

3. A clutch disc arrangement according to claim 1, wherein said further means is an arm portion provided on said control plate means.

4. A clutch disc arrangement according to claim 1, wherein said flange includes aperture means, said connecting means includes connecting elements extending through said aperture means in said flange.

5. A clutch disc arrangement according to claim 4, wherein said control plate means further includes a plurality of axial tab means engageable with said aperture means, at least one of said aperture means being recessed inwardly in the direction of said hub means for accommodating one of said plurality of axial tab means.

6. A clutch disc arrangement according to claim 4, wherein said connecting elements are bolts.

7. A clutch disc arrangement according to claim 1, wherein said further means includes an axially bent-off portion provided on said control plate means at a position circumferentially adjacent each of said two radially extending arms.

8. A clutch disc arrangement according to claim 1, wherein said further means includes a plurality of tabs provided on said control plate means.

9. A clutch disc arrangement according to claim 8, wherein one of said plurality of tabs are provided on said control plate means at a position circumferentially adjacent each of said two radially extending arms.

10. A clutch disc arrangement according to claim 1, wherein said further means includes a plurality of arm portions provided on said control plate means.

11. A clutch disc arrangement according to claim 10, wherein one of said plurality of arm portions are provided on said control plate means at a position circumferentially adjacent each of said radially extending arms.

12. A clutch disc arrangement according to claim 5, wherein an axial tab means is disposed at a position circumferentially adjacent each of said two radially extending arms.

13. A clutch disc arrangement according to claim 12, wherein an additional axial tab means is disposed on said control plate means at a position intermediate said axial tab means disposed adjacent said radially extending arms.

14. A clutch disc arrangement according to claim 1, wherein each of said first, second and third set of window means have a circumferential width, and wherein the circumferential width of said first set of window means is greater than the circumferential width of said second and third sets of window means.

15. A clutch disc arrangement according to claim 14, wherein said further means includes axially bent-off portions provided on said control plate means at a position circumferentially adjacent said radially extending arms, said axially bent-off portions having a circumferential width which is equal to the circumferential width of said second and third sets of said window means.

16. A clutch disc arrangement according to claim 1, wherein said control plate means is formed of sheet metal.

17. A clutch disc arrangement according to claim 16, wherein said further means includes an axially bent-off portion provided on said control plate means at a position circumferentially adjacent each of said two radially extending arms.

* * * * *